United States Patent [19]

Iwata

[11] 4,276,964
[45] Jul. 7, 1981

[54] CALIPER CARRYING STRUCTURE OF PIN-SLIDE TYPE DISC BRAKE

[75] Inventor: Yoichi Iwata, Satte, Japan

[73] Assignee: Akebono Brake Industry Co., Ltd., Tokyo, Japan

[21] Appl. No.: 92,842

[22] Filed: Nov. 9, 1979

[30] Foreign Application Priority Data

Nov. 17, 1978 [JP] Japan .................... 53-141883

[51] Int. Cl.³ .............................. F16D 65/02
[52] U.S. Cl. .................................. 188/73.3
[58] Field of Search ............... 188/73.3, 73.4, 73.5, 188/73.6; 308/237 R, 237 A, 238, 1 A

[56] References Cited

U.S. PATENT DOCUMENTS 4,051,927 10/1977 Karasudani .................... 188/73.3
4,121,700 10/1978 Margetts et al. ................. 188/73.4

Primary Examiner—Douglas C. Butler

[57] ABSTRACT

An improvement over the caliper carrying structure of a pin-slide type disc brake. A caliper straddling a disc is arranged to be slidable in the axial direction of the disc through a pair of slide pins. At least one of the slide pins is secured either to the caliper or to a fixed support disposed at the periphery of the disc and is arranged to be in slidable engagement through a rigid sleeve with an opening formed either in the support or in the caliper. The rigid sleeve is prevented from pulling off its position by a flange formed at one end thereof and is kept between the support and the caliper. The outer and inner circumferential faces of the rigid sleeve are slidable both on the opening and on the slide pin. With two sliding parts provided in this manner, each sliding part is provided with a sealing device independently of the other for protection from the outside.

12 Claims, 4 Drawing Figures

CALIPER CARRYING STRUCTURE OF PIN-SLIDE TYPE DISC BRAKE

BACKGROUND OF THE INVENTION

1. Field of the Invention:

This invention relates to an improvement on the caliper carrying structure of a pin-slide type disc brake.

2. Description of the Prior Art:

A brake device must have an extremely high degree of reliability for braking a vehicle. In a so-called floating type disc brake, a caliper which straddles the periphery of a disc has a mutually confronting parts disposed on both sides of the disc. In one of the confronting caliper parts, there is provided a piston thrusting mechanism which pushes one of a pair of friction pads against the disc. The other friction pad is pushed against the disc by the other caliper part as it is caused to slide in the axial direction of the disc by a reaction to the pushing action of the piston thrusting mechanism. It is essential for such a floating type disc brake to always have smooth slidability.

To ensure such smooth slidability, the sliding parts of the brake must be prevented from rusting and protected from dust and the like by sealing them from the outside. In view of this requirement, there have been provided a variety of disc brakes of the pin-slide type the structure of which facilitates such sealing arrangement. The structural arrangement of the conventional pin-slide type disc brake is such that: There are provided slide pins. Each slide pin is secured either to a caliper or to a support and is arranged to slidably engage with an opening which is provided either in the support or in the caliper. Then, a bellows-like boot is arranged to cover the end of the opening and the outer circumferential part of the slide pin which is located outside of the opening. The brake thus permits sealing arrangement with a simple structure.

The brake device is attached to the body of a vehicle adjacent to the wheel and is not completely covered. Therefore, there is a high degree of probability that the boot is damaged by flying stones. Particularly, under a rough service condition such as frequent running on bad roads, there is a great possibility of having rain water or dust coming into the brake device through such a damaged part to cause insufficient sliding movement of the caliper and eventually to make the brake device inoperative due to rusting of the sliding parts thereof. A further improvement, therefore, has been necessary in the arrangement to keep a pin-slide type brake device smoothly slidable.

SUMMARY OF THE INVENTION

It is therefore a general object of the present invention to provide an improvement over the conventional structural arrangement of the sliding parts, i.e. the caliper carrying structure, of a pin-slide type disc brake for obtaining an excellent sealing effect on the sliding parts.

In accordance with this invention, in a pin-slide type disc brake in which a caliper straddling a disc is arranged to be slidable in the axial direction of the disc through a pair of slide pins disposed on the left and right sides, at least one of the pair of slide pins is secured either to the caliper or to a fixed support disposed at the periphery of the disc and is arranged to be in slidable engagement through a rigid sleeve with an opening formed either in the support or in the caliper. The rigid sleeve is interposed in between the support and the caliper and is prevented from pulling off the interposed position by a flange formed at one end thereof while the outer and inner circumferential faces of the rigid sleeve are arranged to be slidable on the opening and the slide pin. With two sliding parts arranged in this manner, each sliding part is provided with a sealing device independently of the other for protection from the outside.

The above and further objects, features and advantages of the invention will become apparent from the following description of embodiments thereof taken in connection with the accompanying drawings.

BRIEF DESCRIPTION OF THE DRAWINGS

Each of the accompanying drawings is a partly sectional view showing a caliper carrying mechanism of a disc brake as embodiment of the present invention.

DETAILED DESCRIPTION OF THE PREFERRED EMBODIMENTS

Figure 1:
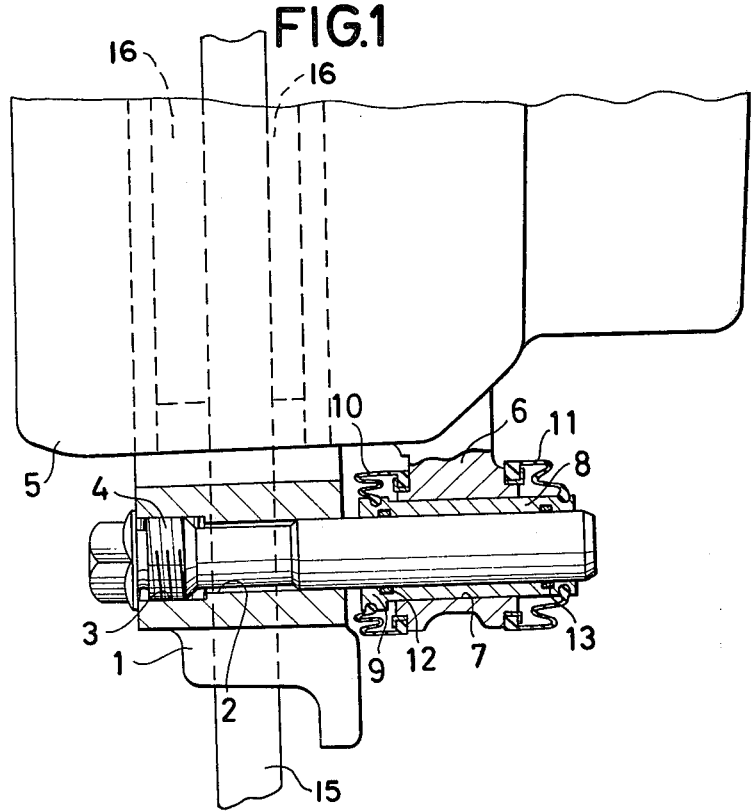
FIG. 1 shows a first embodiment example.

In FIG. 1, a support 1 is secured to a fixed structural part of a vehicle at the periphery of a disc which is not shown. A piercing hole 2 is formed in the support 1. A reference numeral 3 indicates a threaded part. A slide pin 4 is inserted through the piercing hole 2 and is fixed thereto by screwing. A caliper 5 is positioned to straddle the periphery of the disc 15. A braking force is obtained by sliding the caliper 5 in the axial direction of the disc to engage a pair of friction pads 16 with the disc 15. There are provided a boss part 6 which extends sidewise from the caliper 5; an opening 7 which is arranged to have the slide pin 4 inserted therein; and a metal sleeve 8 which is inserted slidably without play in the opening 7 between the slide pin 4 and the opening 7. The metal sleeve 8 is provided with a flange 9 which is formed at one end of the metal sleeve 8 on the side of the support 1 for the purpose of preventing the sleeve from pulling off its position. Boots 10 and 11 which are made of an elastic material are arranged to cover the ends of the opening of the boss part 6 of the caliper 5 and the outer circumference of the metal sleeve 8. There are provided ring-shaped seals 12 and 13 which are interposed in between the slide pin 4 and the metal sleeve 8 for the purpose of sealing the sliding faces of the slide pin 4 and the sleeve 8.

The same arrangement of the slide pin, the sleeve and the opening of the caliper as described in the foregoing is also provided on the other side of the caliper to form a pair of mechanisms for carrying the caliper. However, illustration in the drawing includes only the arrangement provided on one side of the caliper while the arrangement provided on the other side is omitted from the illustration.

In such structural arrangement, when the caliper 5 slides, the sliding movement of the caliper 5 is effected by two faces. With the two sliding faces arranged to have no difference in sliding resistance, the sliding movement takes place either between the slide pin 4 and the sleeve 8 or between the sleeve 8 and the opening 7. However, with the seals 12 and 13 interposed in between the slide pin 4 and the sleeve 8 in the case of this embodiment, the sliding resistance between the slide pin 4 and the sleeve 8 is arranged to be higher than the sliding resistance between the opening 7 and the sleeve 8. With this arrangement, the sliding part between the opening 7 and the sleeve 8 serves as main sliding part while another sliding part between the slide pin 4 and the sleeve 8 serves as auxiliary sliding part.

Conversely, however, the seals 12 and 13 may be provided between the opening 7 and the sleeve 8 instead of between the slide pin 4 and the sleeve 8 to let the sliding part between the opening and the sleeve have a higher sliding resistance so that it may be used as auxiliary sliding part.

In assembling the brake device, the position of the sleeve 8 is determined by the flange 9, which serves to prevent the sleeve 8 from pulling off the position thereof. Further, it is necessary to set the length of the slide pin 4 and that of the sleeve 8 to have their maximum values respectively at a point where the opening or the caliper 5 slides relative to the sleeve 8 while the sleeve 8 is not slidable relative to the slide pin 4 and another point where the sleeve 8 is slidable together with the caliper 5 relative to the slide pin 4 in the initial condition after assembling.

The structural arrangement of the embodiment being as described in the foregoing, even when the boots 10 and 11 are damaged by flying stones, etc. and even if the main sliding part between the opening 7 and the sleeve 8 is caused to rust and stick by rain water which enters there, the caliper is still kept slidable by the auxiliary sliding part, so that the brake device can be effectively prevented from being made inoperative. This advantageous feature is obtainable with a very simple structural arrangement.

Figure 2:
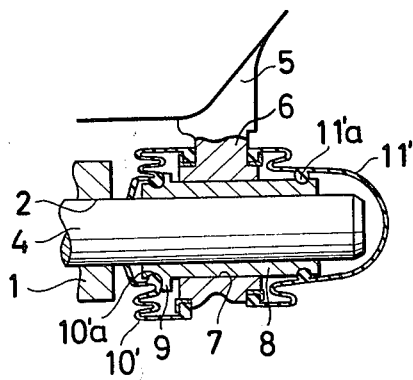
FIG. 2 a second embodiment example.
Figure 3:
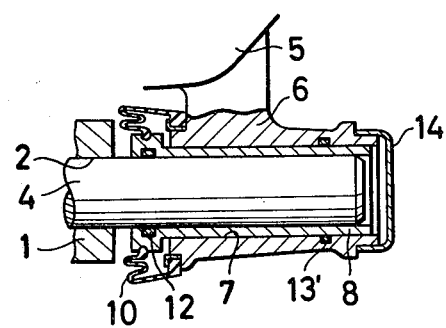
FIG. 3 a third embodiment example.
Figure 4:
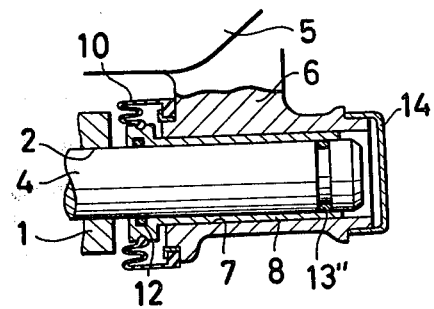
FIG. 4 a fourth embodiment example.

FIGS. 2 to 4 respectively illustrate other examples of embodiment of the invention. In the embodiment shown in FIG. 2, a boot 10' is arranged to extend from the edge of the opening of the caliper 5 to the outer circumference of the slide pin 4 and is provided with a protrudent part 10'a which is disposed in the middle part of the boot 10' and is connected to the sleeve 8. On the other hand, another boot 11' is formed into a bag-like shape to enclose the free end of the slide pin 4 while a protrudent part 11'a formed in the middle part of the boot 11 is connected to the sleeve 8.

In the case of this embodiment, the main and auxiliary sliding parts are respectively sealed by the boots 10' and 11' while the insides of the boots are divided by 10'a and 11'a to prevent each sealed part from being affected by any damage inflicted on another sealed part.

In another embodiment shown in FIG. 3, the free end of the slide pin 4 is sealed by closing one end of the opening 7 with a cap 14 which is employed in place of a boot. Between the sleeve 8 and the opening 7, there is provided a seal 13'. The division between the main and auxiliary sliding parts is arbitrarily determined by the extent of tightening allowance provided between the seals 12 and 13'.

In the embodiment shown in FIG. 4, a seal 13'' is provided between the sleeve 8 and the slide pin 4. The main sliding part is formed between the opening 7 and the sleeve 8 and as the sliding resistance between the slide pin 4 and the slide 8 is larger than that of the main sliding part, an auxiliary sliding part is formed between the slide pin and the sleeve.

As described in the foregoing, in accordance with the present invention, two sliding parts are provided for each slide pin. These sliding parts are respectively protected by two sliding devices each of which is arranged independently of the other, so that when one sealing device gets out of order, the sliding part which is under the protection of the other sealing device still keeps the caliper slidable, so that the reliability of the brake device can be enhanced.

In the preferred embodiments of the invention described in the foregoing, the pair of slide pin parts have been described to be of identical structure with each other. However, the description is for illustrative purposes only and it is to be understood that the pair of slide pins do not have to be arranged in the same manner. For example, the invented arrangement may be applied only to one of the slide pins to use it as main slide pin while the other slide pin may be arranged as auxiliary slide pin with an elastic bush used in combination therewith, or, conversely, a slide pin arranged in accordance with the present invention may be used as auxiliary slide pin instead of as main slide pin. The sliding parts of the slide pin may be made of stainless steel and the sleeve may be made of resin.

What is claimed is:

1. A caliper carrying structure for a pin-slide type disc brake having a caliper member which is carried by a support member in such a way as to be slidable in the axial direction of a disc and is arranged to push a friction pad against said disc, said caliper carrying structure comprising:
    a slide pin which is secured to one of said two members;
    an opening provided in the other of said two members and arranged to have said slide pin inserted therein;
    a rigid sleeve disposed between said slide pin and said opening and arranged to be slidable on both said slide pin and said opening;
    a first sliding part provided between said opening and said sleeve; and
    a second sliding part provided between said slide pin and said sleeve.

2. A caliper carrying structure according to claim 1, wherein the sliding part of said slide pin is made of an anticorrosion material and said rigid sleeve is made of a resin material.

3. A caliper carrying structure according to claim 1, further comprising:
    a first seal device arranged to protect said first sliding part; and
    a second seal device arranged to protect said second sliding part.

4. A caliper carrying structure according to claim 3, wherein said first seal device is provided with a boot which is disposed between said sleeve and said the other of two members.

5. A caliper carrying structure according to claim 4, wherein said second seal device is provided with a ring-shaped seal which is disposed between said slide pin and said sleeve.

6. A caliper carrying structure according to claim 5, wherein the sliding resistance at said first sliding part is less than that of said second sliding part.

7. A caliper carrying structure according to claim 3, wherein said first and second seal devices are boots which are respectively disposed at both ends of said opening, each of said boots having the middle part thereof arranged in sealing engagement with said sleeve.

8. A caliper carrying structure according to claim 1, wherein one end of said opening is closed; at the other end of said opening, a boot is provided between said the other of two members and one end of said sleeve; and there is provided a first ring-shaped seal between one end of said sleeve and said slide pin.

9. A caliper carrying structure according to claim 8, wherein there is provided a second ring-shaped seal between the other end of said sleeve and said opening.

10. A caliper carrying structure according to claim 8, wherein there is provided a second ring-shaped seal between the other end of said sleeve and said slide pin.

11. A caliper carrying structure according to claim 10, wherein the sliding resistance at said first sliding part is less than that of said second sliding part.

12. A caliper carrying structure for a pin-slide type disc brake having a caliper member which is carried by a support member in such a way as to be slidable in the axial direction of a disc and is arranged to push a friction pad against said disc, said caliper carrying structure comprising:

a slide pin which is secured to one of said two members;

an opening provided in the other of said two members and arranged to have said slide pin inserted therein;

a rigid sleeve disposed between said slide pin and said opening and arranged to be slidable on both said slide pin and said opening;

a first sliding part provided between said opening and said sleeve;

a second sliding part provided between said slide pin and said sleeve;

a first seal device arranged to protect said first sliding part; and a second seal device arranged to protect said second sliding part.

* * * * *